United States Patent
Portman et al.

(10) Patent No.: US 8,531,501 B2
(45) Date of Patent: Sep. 10, 2013

(54) SYSTEM AND METHOD FOR ASSISTING AN AGENT IN A CONTACT CENTER

(75) Inventors: Leon Portman, Rishon Lezion (IL); David Geffen, Givat Shmuel (IL); Nadav Doron, Kfar Saba (IL); Itay Grushka, Shoham (IL)

(73) Assignee: Nice-Systems Ltd., Ra'anana (IL)

( * ) Notice: Subject to any disclaimer, the term of this patent is extended or adjusted under 35 U.S.C. 154(b) by 448 days.

(21) Appl. No.: 13/037,979

(22) Filed: Mar. 1, 2011

(65) Prior Publication Data

US 2012/0224020 A1 Sep. 6, 2012

(51) Int. Cl.
*H04N 7/15* (2006.01)
*H04M 3/00* (2006.01)
*G06F 9/00* (2006.01)
*G06Q 10/00* (2012.01)

(52) U.S. Cl.
USPC .............. 348/14.02; 379/265.01; 379/265.09; 702/184; 704/275; 705/7.13; 705/7.14; 705/7.32; 705/26.1; 705/30; 709/227; 719/310; 726/1

(58) Field of Classification Search
USPC .............. 348/14.02; 379/265.01, 265.09; 702/184; 704/275; 705/7.13, 7.14, 7.32, 705/26.1, 30; 709/227; 719/310; 726/1
See application file for complete search history.

(56) References Cited

U.S. PATENT DOCUMENTS

| | | | |
|---|---|---|---|
| 6,807,533 B1 * | 10/2004 | Land et al. ...................... 705/30 |
| 6,816,815 B2 * | 11/2004 | Takayama ..................... 702/184 |
| 6,829,585 B1 * | 12/2004 | Grewal et al. ................ 705/7.14 |
| 7,047,557 B2 * | 5/2006 | Enomoto ......................... 726/1 |
| 7,178,148 B2 * | 2/2007 | Enomoto ...................... 719/310 |
| 7,787,609 B1 * | 8/2010 | Flockhart et al. ......... 379/265.01 |
| 8,396,735 B2 * | 3/2013 | Lauffer ........................ 705/7.14 |
| 2005/0278446 A1 * | 12/2005 | Bryant .......................... 709/227 |
| 2006/0064304 A1 * | 3/2006 | Greenstein et al. ............... 705/1 |
| 2007/0033221 A1 * | 2/2007 | Copperman et al. ...... 707/103 R |
| 2007/0255637 A1 * | 11/2007 | Henry ......................... 705/36 R |
| 2008/0040198 A1 * | 2/2008 | Friedrich et al. ................ 705/10 |
| 2009/0097634 A1 * | 4/2009 | Nambiar et al. ......... 379/265.09 |
| 2010/0274618 A1 * | 10/2010 | Byrd et al. ........................ 705/9 |
| 2010/0303224 A1 * | 12/2010 | Erhart et al. ............. 379/265.09 |
| 2011/0191134 A1 * | 8/2011 | Jain et al. ..................... 705/7.13 |
| 2012/0224020 A1 * | 9/2012 | Portman et al. ............ 348/14.02 |

* cited by examiner

*Primary Examiner* — Gerald Gauthier
(74) *Attorney, Agent, or Firm* — Pearl Cohen Zedek Latzer Baratz, LLP (57) ABSTRACT

Embodiments of the invention are directed to a system and method for assisting a service representative an enterprise. A device operated by an agent and a mobile communication device operated by an expert may be associated by a registration at a server. An indication of required assistance may be provided to the mobile communication device. The mobile communication device may included in a session already including a device operated by the agent and a device operated by a customer.

20 Claims, 7 Drawing Sheets

| AGENT ACTIVITY | | | | | |
|---|---|---|---|---|---|
| CHANNEL NAME | CALL DURATION | PREDICTOR | RULE | STATUS | SCREEN ACTIVITY |
| EXT. 3700 | | | | | |
| EXT. 3788 | 00:03:53 | ◯ | | | CRM TYPE: SERVICE CALL, CUSTOMER STATUS: SILVER, SUBJECT: SERVICE NOT PROVIDED |
| EXT. 3766 | 00:02:53 | | | | |
| EXT. 3756 | 00:03:43 | | | | |
| EXT. 3798 | 00:13:12 | ◯ | CALL DURATION | ⊗ | CRM TYPE: SERVICE CALL, CUSTOMER STATUS: GOLD, SUBJECT: PRODUCT DOESN'T WORK |
| EXT. 3701 | 00:03:53 | ◯ | | ☻ | CRM TYPE: BILLING, CUSTOMER STATUS: NORMAL, SUBJECT: MARCH BILLING |
| EXT. 3777 | 00:03:53 | | | | |
| EXT. 3712 | 00:03:53 | | | | |
| EXT. 3768 | 00:03:53 | | | | |
| EXT. 3799 | 00:03:53 | ◯ | | ☻ | CRM TYPE: SALE, CUSTOMER STATUS: NEW, SUBJECT: PRODUCT PURCHASE |
| EXT. 3788 | 00:03:53 | ◯ | | ☻ | CRM TYPE: SALE, CUSTOMER STATUS: NEW, SUBJECT: PRODUCT PURCHASE |
| EXT. 3767 | 00:03:53 | | | | |
| EXT. 3755 | 00:03:53 | | | | |

INDICATES THE PROBABILITY OF A BREACHED RULE

THE REASON FOR THE PREDICTOR TO GO RED

DISPLAYS ACTIVE AGENTS AND COLORED IN RED IF ASSISTANCE IS REQUIRED BY CSR AND YELLOW IF REQUIRED BY RULE

REAL TIME SCREEN EVENT CAPTURE FROM AGENT DESKTOP iXpert    HELLO TOM BROWN   SIGN OUT   NICE

SYSTEM AND METHOD FOR ASSISTING AN AGENT IN A CONTACT CENTER

BACKGROUND OF THE INVENTION

A contact center may employ a large number of customer service representatives (CSR), customer service advisors (CSA) or similar personnel generally referred to herein as agents. Agents interact with customers to provide services, e.g., answers to inquiries, performing transactions, selling products or services and the like. Agents in a modern contact center may be required to provide information, complete transactions and solve problems related to a large number of services and products as well as be able to operate a large number, in times complicated, computer applications. Agents traditionally use phones in order to interact with customers and workstations in order to access customer or other data, e.g., in a customer relationship management (CRM) system. Since providing a good and timely service to a customer is an essential element in a success of a contact center, agents may further be required to perform tasks such as mentioned above in real time, e.g., while talking or otherwise interacting with a client or a potential customer.

To assist agents, supervisors and/or experts (S&E) are employed. An expert or supervisor may have extended knowledge, skills, expertise, privileges and/or other capabilities regarding services provided by the contact center and/or applications or systems that need to be operated. Typically, upon encountering a problem or difficulty, an agent may call or alert an expert for assistance. In other cases, a supervisor may join a session or interaction between an agent and a customer in order to monitor or evaluate performance of an agent, quality of service, work flow or any relevant aspects related to an operation of the contact center. In other cases, an expert may join an interaction or session in order to train an agent. Currently, when joining a session or interaction, e.g., a phone call, an expert may be able to hear the agent and/or customer as well as be heard by the agent only, or by both the agent and customer. However, by merely joining a voice interaction or channel, the expert may not be provided with sufficient information that may be necessary in order to best assist the agent and/or the customer, or cause the best conclusion or outcome of an interaction or session.

For example, in joining a session or interaction as done by prior art, an expert is not provided with information related to the customer, the product or service discussed nor with information related to the agent. Although enabling an expert to join a voice session or call using a mobile phone, with this enablement prior art systems and methods do not provide the expert with information related to the customer, the product or service or the agent nor information or data related to the session so that the expert may be aware of the development, context or history of the session or interaction. For example, the expert can not see the screen of the agent's workstation nor have access to stored information, e.g., in a CRM system. Using a desktop or workstation, an expert may have access to relevant information. However, in such scenario the expert is confined to his or her desk and further may be required to use two devices, a phone for participating in a call and a workstation for accessing information. Furthermore, as experts in a contact center typically need to be mobile, using a stationary computer may be an inadequate solution.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

FIG. 5 shows an exemplary screenshot according to embodiments of the invention;

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those having ordinary skill in the art that the invention may be practiced without these specific details. In other instances, well-known methods, procedures, components, modules, units and/or circuits have not been described in detail so as not to obscure the invention.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like.

Unless explicitly stated, the method embodiments described herein are not constrained to a particular order or sequence. Additionally, some of the described method embodiments or elements thereof can occur or be performed at the same point in time or overlapping points in time. As known in the art, an execution of an executable code segment such as a function, task, sub-task or program may be referred to as execution of the function, program or other component.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Figure 1:
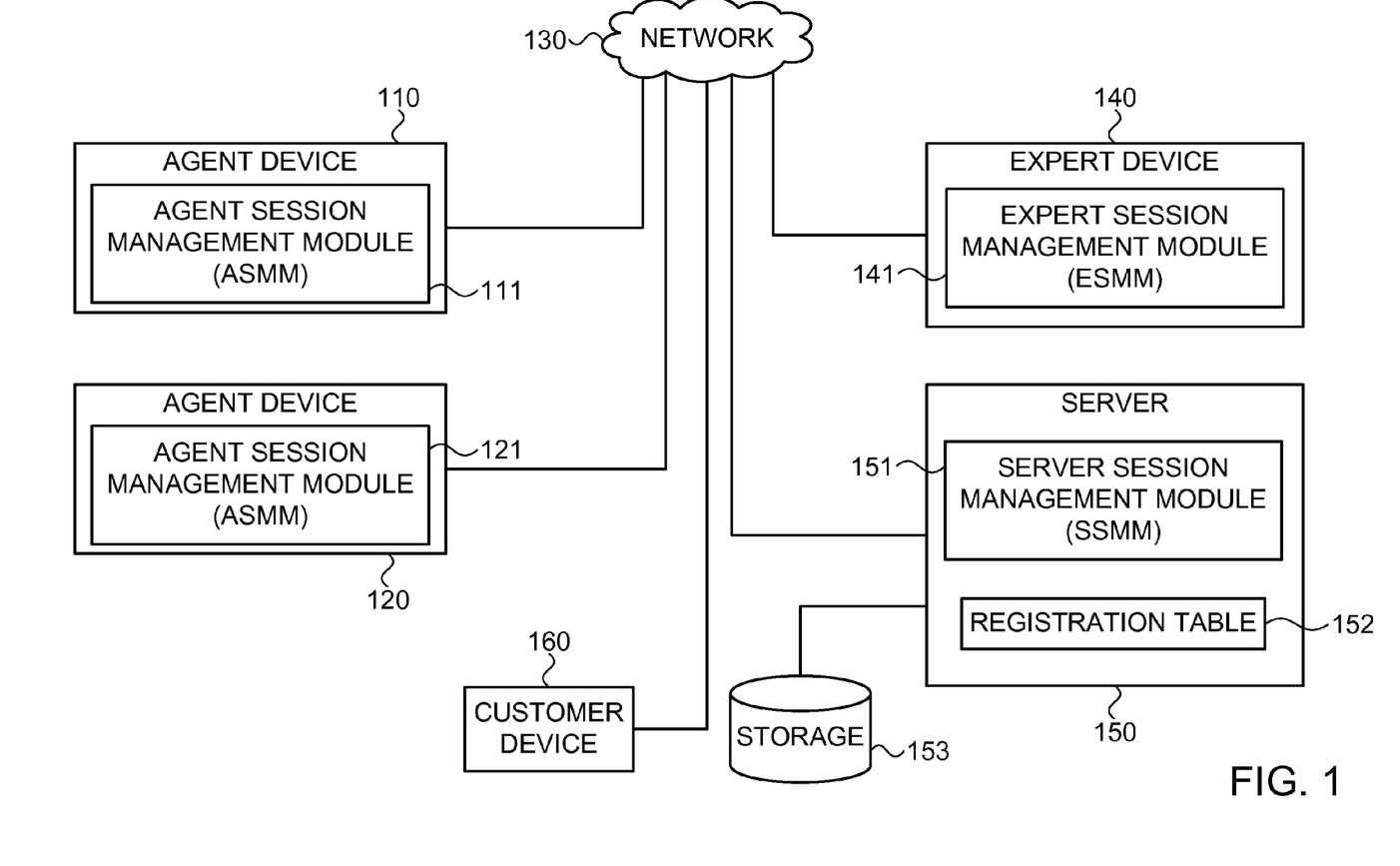
FIG. 1 shows an exemplary setup according to embodiments of the invention.

Reference is made to FIG. 1 that shows an exemplary setup according to embodiments of the invention. As shown, a setup may include agent devices 110 and 120 which may respectively include or be operatively connected to agent session management modules (ASMM) 111 and 121. As further shown, a setup may include a customer device 160, an expert device 140 (also referred to herein as iXpert device) that may include or be operatively connected to an expert session management module (ESMM) 141. The setup may further include a server 150 that may include or be operatively connected to a server session management module (SSMM) 151 and a registration table 152. As further shown, server 150 may be operatively connected to a storage 153. The setup may further include network 130 that may enable agent devices 110 and 120, customer device 160, expert device 140 and server 150 to communicate.

In a typical setup, agent devices 110 and 120, server 150 and expert device 140 and may be located within, or otherwise associated with, a contact center, an enterprise, a department of an organization, a unit or a location assigned a task of interacting with customers, clients or other entities. In some embodiments, although associated with a contact center, agent devices 110 and/or 120 and/or expert device 140 may be physically located elsewhere, e.g., in a home of an agent, a service representative or an expert. Accordingly, although the discussion herein will mainly relate to agents and experts in a contact center, embodiments of the invention may be realized in other setups or configurations. For example, embodiments of the invention may be applicable to service representatives in an enterprise, employees in a bank assigned the task of interacting with customers, a department in an academic institution whose tasks include interacting with students or a department in a medical facility in charge of interacting with patients. For the sake of simplicity and clarity, a contact center will mainly be referred to herein, however, it will be understood that embodiments of the invention are not limited to a contact center and may be realized or applicable in other setups, scenarios or configurations.

For the sake of clarity and simplicity, only some of the components and/or devices in a possible setup are shown. For example, in a typical contact center employing a large number of agents or service representatives, a large number of devices such as agent or service representative devices 110 and 120 may be deployed. In a typical setup, a very large number of user devices such as user device 160 may be present or active, for example, a contact center may serve or interact with hundreds of customers operating customer devices such as customer device 160. Likewise, any number of servers 150 and/or storages such as storage 153 may be deployed and a large number of experts (e.g., in a contact center) may operate a respective large number of expert devices such as expert device 140. Accordingly, it will be realized that embodiments of the invention are not limited by the number of components shown in FIG. 1.

Agent devices 110 and 120 may any applicable device used by service representatives in an enterprise for interacting over a session with a customer. For example, a session may be a telephone call, a web session (e.g., a chat session or a document sharing session), a text based session, e.g. a short message service (SMS) session or an electronic mail (email) session or it may be a web chat session, e.g., using a commercial online internet online chat application. For example, agent device 110 may be a telephone, a smartphone or any device or system enabling an agent to talk to a customer or otherwise participate in a voice session. Agent device 120 may be a desktop or laptop computer, a personal digital assistant (PDA), a workstation, a server or any other computing device enabling an agent to send and receive digital information as well as process, display, replay or otherwise present digital information. In some embodiments, an agent may use agent device 110, which may be capable of establishing and maintaining a voice channel, in order to participate in a voice session and, possibly at the same time, use agent device 120, which may be capable of establishing and maintaining a data channel, in order to participate in a data session, e.g., send/receive data to/from expert device 140 or server 150 over network 130. As discussed, agent device 120 may also be configured to process and present digital information.

Expert device 140 may be any computing and/or communication device enabling an expert to roam or be otherwise mobile while maintaining a communication link. Expert device 140 may support both voice and data channels. For example, expert device 140 may be a tablet computer that may enable an expert to participate in a voice session (e.g., a phone or conference call, using a microphone and a speaker or earpiece) and also enable an expert to send and receive digital information or data. Expert device 140 may further be configured to process and present digital information, e.g., using a controller, a memory and input and output components such as a display, a keyboard, a stylus, a mouse and/or speakers.

For example, expert device 140 may be a commercial business tablet device such as Apple iPad®, Cisco Cius®, Google Chrome OS tablet®, Dell Streak®, Samsung Galaxy® Tab, RIM PlayBook® and/or HP PalmPad®. Accordingly, expert device 140 may be any device having suitable computational and presentational capabilities and further capable of providing connectivity and mobility. For example, expert device 140 may a device supporting communication platforms, protocols or technologies such as a wireless local area network operating according to the IEEE 802.11 standards family (e.g., Wi-Fi), International Mobile Telecommunications-2000 (IMT-2000), also known as 3G or '3rd Generation' family of standards for mobile telecommunications and/or Global System for Mobile Communications (GSM).

Session management modules ASMM 111, ASMM 121, ESMM 141 and SSMM 151 may be or may include specific hardware modules, e.g., manufactured on cards that may be installed on a computing device. In some embodiments, these session management modules may be or may include hardware, firmware, software or any combination thereof. These session management modules may be configured to interact with hardware and/or software in an associated device. For example, ASMM 111 may interact with an application or a hardware on agent device 110 to receive any information or data related to an operation of agent device 110, e.g., any information or data related to a session involving or related to, agent device 110. For example, an indication of an incoming call, an establishment or termination of a session, voice and or data exchanged, sent or received by agent device 110 may be provided to ASMM 111. Accordingly, a phone number of a caller or an analog or digitized voice of a caller and an agent may be provided to ASMM 111 that may process received or obtained information and data and/or communicate received or other information, e.g., to ASMM 121, ESMM 141 and/or SSMM 151.

Registration table 152 may be any construct or object suitable for storing relevant information. Although a registration table 152 is mainly referred to herein, it will be understood that any suitable objects may be likewise used. For example, a linked list or a set of database records may be used instead of or in addition to registration table 152. For example, a record in an association table may comprise a number of entries that may be used for linking or associating devices.

For example, a first and second entries in a record may include parameters related to a respective first and second devices that may be, for example, agent device 110 and expert device 140. For example, network addresses, contact ports (e.g., related to a PBX) or other parameters that may be required in order to establish a communication between the first and second devices may be included in entries in a record in registration table 151. Any other parameter may be included in an association table, e.g., information related to an agent operating an associated device, rules used in order to determine operations. For example, a rule or criteria based on which an expert device may be alerted may be stored in an association table. Registration table 152 may include records for any applicable entity, a record may include a number of entries. For example, a "session record" may include entries for, or references to, entities such as an agent, a caller, an expert, a session identification code, parameters related to devices used (e.g., agent and expert devices addresses or associated ports in a private branch exchange (PBX)) or an entry for a product or service discussed and the like.

A rule based on which an indication assistance is required or an expert may be alerted may be related to any one or more aspects or parameters such as a call duration, a probability of a successful completion of a call, content communicated over a session, an agent, a customer, a product and/or a service. For example, a rule related to a (possibly specific) customer representative may dictate specific actions performed by the customer representative are to trigger an indication of required assistance or alert an expert. A rule related to a product or service may cause alerting an expert, e.g., a price quote lower than a predefined amount with relation to a product may cause ASMM 111 to generate an indication or alert and communicate such indication to server 150. A rule related to spoken word (either by a customer or agent) may cause alerting an expert, e.g., a competitor mentioned in a call (for example, as captured by ASMM 111) may cause ASMM 111 to generate an indication of required assistance, likewise, specific content communicated over a session (e.g., a link to a web site of a competing entity) may cause alerting an expert, e.g., as described herein.

A rule based on which an indication that assistance is required or attention of an expert is required or advisable may be related to aspects that may be unrelated to a specific interaction or session. For example, a training program may be designed and/or configured such that upon detecting a sequence of actions. For example, an activation of a number of applications, specific GUI widgets interacted with or a set of keys pressed may cause an expert to be alerted. In other examples, a back office application may be interacted with and an indication that assistance is required or an expert's attention is needed may be generated based on a back office application or system. For example, any application on a back office system may interact (e.g., over network 130) with server 150 and provide SSMM 151 with any information, indications or parameters. SSMM 151 may apply any rule or criteria to data received from back office or other applications and may cause one or more experts to be alerted by providing their respective devices an indication, e.g., as described herein.

In some embodiments, an entry may include a reference or pointer rather than actual data. For example, an entry may include a pointer to an agent record in a database or a pointer to data related to a product or a pointer to a customer's record in a CRM system. Although for the sake of simplicity, only one registration table is shown, in some embodiments a number of such or similar tables may be used. For example, tables similar to registration table 152 may exist, be placed or be otherwise associated with agent devices 110 and 120 and/or expert device 140. In any case, any information in registration table 152 may be provided to any computing device or module, e.g., over network 130. Accordingly, information obtained from or by registration table 152 may be provided to any one of session management modules ASMM 111, ASMM 121 and/or ESMM 141.

Registration table 152 may be updated dynamically, e.g., by SSMM 151. For example, ASMM 111 may inform SSMM 151 upon establishment of a call involving agent device 110 (e.g., when an agent operating agent device 110 receives a call from a customer), and SSMM 151 may update registration table 152 accordingly. When a product discussed in a session or call is determined (e.g., by ASMM 111 based on analysis of voices of an agent and a customer), SSMM 151 may informed and may update registration table 152 accordingly.

Server 150 may be any suitable server or computing device or system or it may be a number of computing devices. Storage 153 may be any suitable storage device or system. For example, Storage 153 may include or may be, a hard disk drive, an array of hard disks, a tape, a Compact Disk (CD) drive, a CD-Recordable (CD-R) drive, or other suitable removable and/or fixed storage units or it may include or may be a USB storage device or a network storage device or system. Storage 153 may be or may include a database and a database application, or it may be or may include a customer relationship management (CRM) system or any commercial storage or database system. Customer device 160 may be a wireless or mobile phone, a smartphone, a computer or any device that may be used be a customer to call, or interact with, an agent or a contact center or interact with a remote computing or communication device.

Network 130 may be, may comprise or may be part of a private or public IP network, or the internet, or a combination thereof. Additionally or alternatively, network 130 may be, may comprise or may be part of a global system for mobile communications (GSM) network. For example, network 130 may include or comprise an IP network such as the internet, a GSM related network and any equipment for bridging or otherwise connecting such networks as known in the art. In addition, network 130 may be, may comprise or be part of an integrated services digital network (ISDN), a public switched telephone network (PSTN), a public or private data network, a local area network (LAN), a metropolitan area network (MAN), a wide area network (WAN), a wireline or wireless network, a local, regional, or global communication network, a satellite communication network, a cellular communication network, any combination of the preceding and/or any other suitable communication means. Accordingly, numerous elements of network 130 are implied but not shown, e.g., access points, base stations, communication satellites, GPS satellites, routers, telephone switches, etc. It will be recognized that embodiments of the invention are not limited by the nature of network 130.

A portion of network 130 may be internal to a contact center and another portion of network 130 may be external to a contact center. For the sake of simplicity, such possible portions are not shown, however, it will be understood that network 130 may be configured to enable any configuration or setup required. For example, secured communication (e.g., confined to a contact center) between an agent and an expert using devices 110, 120 and 140 may be enabled by network 130. Communication between an agent, an expert and a customer over a public or global network may be enabled by a public or global network portion included in network 130. Suitable network devices such as switches, routers and firewalls may be included in network 130 to enable any required configuration, e.g., a separation of an internal and external networks or enabling devices that use wireless communication to communicate with devices using wired networks.

Figure 2:
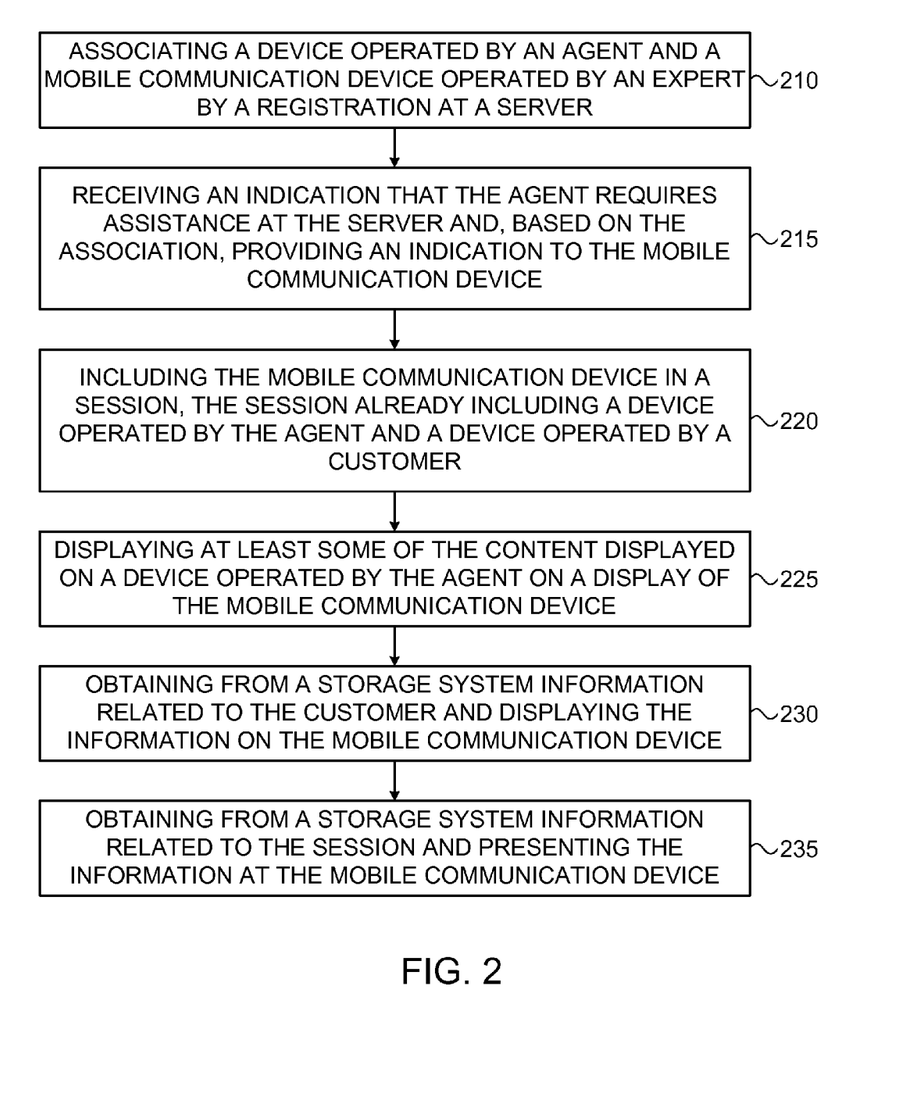
FIG. 2 is a flowchart diagram according to some embodiments of the present invention.

Reference is now made to FIG. 2 that shows a flowchart diagram of a method or flow according to some embodiments of the present invention. The method or flow described herein, may enable an expert to be fully mobile while still be provided with full visibility of, or accessibility to, any agent and/or customer data including screen data, voice data or any relevant parameters or information.

As shown by block 210, the method or flow may include associating a device operated by an agent and a mobile communication device operated by an expert by a registration at a server. As discussed herein, registration at a server may be at server 150 or it may be at, or with, a PBX, a Cellular provider or any other applicable system or entity. For example, ASMM 111 may register agent device 110 at server 150. For example, ASMM 111 may provide SSMM 151 with information such as an internet protocol (IP) address of agent device 110, a port in a private branch exchange (PBX) or any other relevant information or parameter. Parameters provided by ASMM 111 to SSMM 151 may be entered into registration table 152 and may enable SSMM 151, expert device 140 or any other device or module to interact or communicate with agent device 110. Accordingly, an association by a registration may enable performing operations as discussed herein, e.g., a registration at a telephony system may enable including a mobile communication device (e.g., operated by an expert) in a telephone call related to an agent device and a customer device.

Possibly in a similar manner, expert device 140 may register at server 150. For example, ESMM 141 may provide SSMM 151 with a parameter that may be used to establish a wireless communication channel with expert device 140. Although for the sake of clarity and simplicity, a registration with a server (e.g., server 150) is mainly discussed herein it will be understood that embodiments of the invention are not limited to such registration. For example, in some embodiments, a registration may be made at a telephony system and including a mobile communication device operated by an expert in a session related to a device operated by an agent may be performed using devices or systems of the telephony system. For example, a module similar to SSMM 151 may be included in, or operatively connected to, a PBX, and a registration may be performed at the PBX. In another example, registration with a service provider that may be external or even unrelated to a contact center may performed. For example, an operator of mobile telecommunication networks or a provider of wired or wireless communication services may enable a registration and/or association of devices such that they may communicate and/or be associated, e.g., as described herein.

As shown by block 215, the flow may include receiving an indication that the agent requires assistance at the server and, based on the association, providing an indication to the mobile communication device. An indication may be generated based on input received from an agent (e.g., using a GUI widget associated with code or application that may generate and send an indication based on agent's input or action), based on actions performed by an agent and/or based on a rule applied to any information, parameter of data related to a session. For example, an action of an agent triggering a request for assistance or triggering an indication that assistance is required may be a pressing of a dedicated GUI widget. An action of an agent may be an activation of a software module or a device. For example, according to a configuration, a predefined action, e.g., invoking a CRM application by a new agent may automatically cause ASMM 121 to indicate assistance is required by the new agent (who may be assumed to have no or little knowledge needed in order to operate the CRM application). Likewise, any action or operation (or a predefined sequence of actions or operations) performed by an agent may be detected, e.g., by ASMM 121 and may cause ASMM 121 to generate an indication that assistance is required. Accordingly, an indication of required assistance may be automatically generated and provided to an expert.

For example, ASMM 121 may inform SSMM 151 that an agent operating agent device 120 needs assistance. SSMM 151 may, upon receiving an indication that assistance is required, examine an association or registration table (e.g., registration table 152), determine a device associated with device 120, e.g., expert device 140, and provide an indication the associated device. An indication that assistance is required may include any information or parameters, e.g., information related to the agent, the customer, a product or service discussed and information related to the session or call, e.g., a call duration. An indication of required assistance may include any relevant information, e.g., any information stored in a session record in registration table 152.

Various methods and/or events may be used in order to determine that an indication of required assistance is to be generated, sent or provided. In some embodiments, generating and/or sending an indication that the agent requires assistance to the server may be based on a rule. For example, ASMM 111 may be provided with one or more rules, thresholds or criteria based on which it may determine an indication of needed assistance is to be generated. For example, ASMM 111 may monitor an interaction or session in which agent device 110 is involved and, based on a rule, threshold or criterion and information related to the session, may generate an indication that assistance is needed and send the indication to SSMM 151. For example, a rule may mandate that a call duration of more than ten (10) minutes may cause an indication of a required assistance or a request for assistance. Accordingly, ASMM 111 may monitor call durations and, upon determining a call duration has exceeded a threshold, ASMM 111 may communicate a request for assistance to SSMM 151. Accordingly, determining an agent requires assistance may be automatically performed by ASMM 111.

An automated procedure of determining an agent may need assistance may be distributed. For example, some aspects of a call or session may be monitored or analyzed by SSMM 151 or other modules while other aspects, parameters or information of the same session may be monitored and/or analyzed by ASMM 111. For example, ASMM 111 may monitor, analyze and/or process, in real-time, data and voice communicated over a session, while SSMM 151 may monitor other related information or aspects of the same session, e.g., based on data in registration table 152. In such case, either one of ASMM 111 and SSMM 151 may determine the agent involved in the session may need assistance. For example, ASMM 111 may inform SSMM 151 upon an establishment and a termination of a session thus enabling SSMM 151 to monitor, measure or determine a call or session duration. Informing SSMM 151 of an establishment of a session may include any related information. For example, ASMM 111 may provide SSMM 151 with information related to the customer involved in the session, a product that is being discussed or any relevant information. SSMM 151 may extract any relevant information, e.g., from storage 153, and may use such information in determining assistance may be required. For example, provided with details related to a caller or customer, SSMM 151 may extract data related to the specific customer, e.g., purchases made by the customer, results of previous interactions with the customer and the like and may further determine assistance is required based on such data extracted from storage 153.

As described herein, SSMM 151, ASMM 111 and ASMM 121 may communicate over network 130 with each other, hence, any information available to one of these modules may be available to the other modules. Accordingly, it will be understood that any processing or functionality described with respect to one of these modules may, in a different setup or configuration, be performed by another one of these modules or any suitable unit.

A determination that an agent needs assistance may be based on information related to the customer, based on information related to the agent, based on information related to the session and/or based on any data or voice communicated over a session. For example, based on information stored in a CRM system related to a first and second customers, a call duration extending fifteen (15) minutes with the first customer may cause ASMM 111 or SSMM 151 to generate a request for assistance while a call duration only extending three (3) minutes with the second customer may cause ASMM 111 or SSMM 151 to generate a request for assistance. Such customer based selective thresholds may be based, for example, on a rating of customers. For example, it may be desirable to automatically alert an expert or invite the expert to intervene in a call with a gold customer after three minutes but only alert the expert after seven minutes duration of a call with a silver customer.

A rule or criterion for generating a request for assistance may be based on information related to a product. For example, an expert may be alerted when a duration of call related to a first product or service has exceeded twelve (12) minutes, e.g., a call related to a service known to take long to provide but may be alerted when a duration of call related to a second product or service has exceeded two (2) minutes, e.g., a call related to a simple product or a product the selling of which is in high priority. Accordingly, an indication that assistance may be required or needed by an agent may be automatically generated based on any relevant information.

An indication that assistance may be required or needed may be based on parameters related to the session, e.g., an elapsed time, a location of the customer, a device used by the customer etc. For example, before alerting an expert, e.g., by sending an indication of required assistance to SSMM 151, ASMM 111 may allow a session involving a customer using a home computer to proceed longer than a session involving a customer using a telephone. An indication that assistance may be required or needed may be based on information communicated over a session between an agent and a customer. For example, based on voice or data communicated over a session. For example, using speech analysis, e.g., word spotting, ASMM 111 may determine that assistance is required, e.g., upon detecting a predefined word, phrase or pattern in a conversation between an agent and a customer. In some embodiments, an indication that an agent requires assistance may be generated, sent or provided based on an action of the agent. For example, a graphical user interface module (not shown) on agent device 120 may enable an agent to interact with ASMM 121 to indicate assistance is required. Accordingly, upon receiving input from an agent or user, ASMM 121 may register the agent and/or agent device 120 at server 150, e.g., as described herein.

Figure 3:
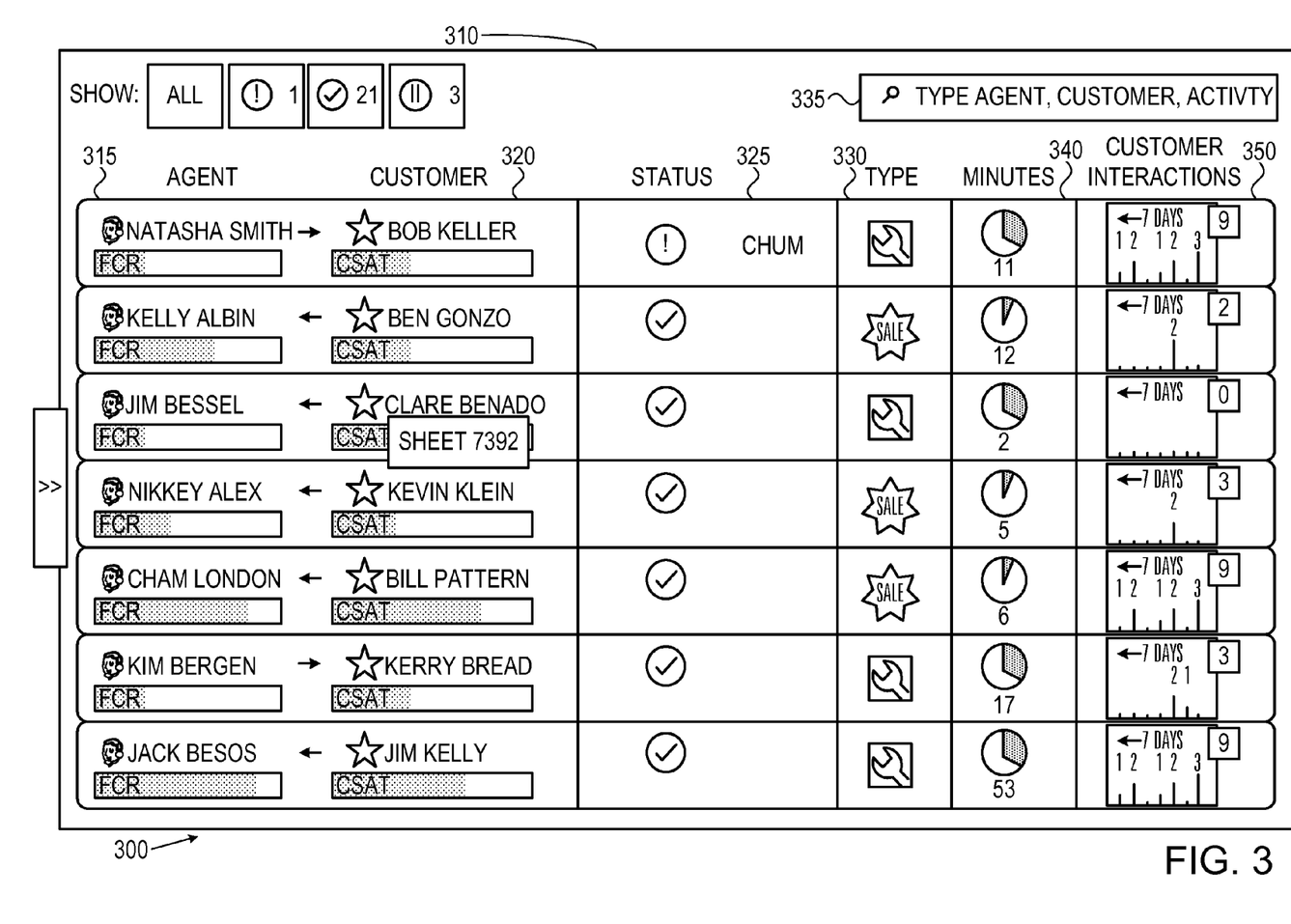
FIG. 3 shows an exemplary screenshot according to embodiments of the invention.

In some embodiments, status information related to agents and/or agents' devices may be provided or displayed on a mobile communication device operated by an expert. Accordingly, an expert may be able to monitor sessions. An expert may select to join a session, accordingly, including a mobile communication device in a session may be based on a selection of the expert. For example, a graphical user interface (GUI) application on expert device 140 (not shown) may provide an expert with graphical or other representation of information related to sessions. Reference is additionally made to FIG. 3 that shows an exemplary screenshot according to embodiments of the invention. As shown by screenshot 300, information related to a number of sessions may be simultaneously displayed. As shown by 310, an expert may select attributes of displayed sessions, e.g., sessions for which assistance has been requested or determined to be needed, sessions progressing normally, sessions stopped or paused etc.

As shown by 335, an expert may search for sessions, e.g., by an agent or customer name, by a product, a service or any relevant parameter. For example, an expert may be provided with status or other information of all sessions in a contact center which are related to a specific product, or all sessions currently handled by a specific agent and so on. For example, a call or session duration and status, a probability of a successful completion of a call or session, information related to an agent and a customer and a reason for a request of assistance may be displayed. As shown by 315 and 320, the names of an agent and a customer included in a session may be displayed. As shown by 325, the status of the session may be displayed, for example, the status may be or may indicate assistance is required, session progressing normally or session is paused (e.g., a phone call is on hold). As shown by 330, a type of the session may be displayed. For example, a type of a session may be a "sale" for a session related to selling a product or "support" for a session related to providing support, e.g., for a previously sold product. As shown by 340, duration of a session or call may be displayed and as shown by 350, statistical or other information related to the session may be presented. For example and as shown, the number of interactions associated with the customer over a period of time may be shown.

Any information related to a session, e.g., stored on storage 153, obtained from an operator (e.g., an operator of a wireless communication network) and/or in registration table 152 may be provided to a device operated by an expert and may be presented, e.g., graphically as depicted by FIG. 3 or otherwise. Information displayed, presented or provided on an expert device or on an agent device may be raw data, processed data and/or results of processing information. For example, ESMM 141 and/or ASMM 111 may process received data and present a user with results or information obtained by processing information. An application or unit, (e.g., in server 150) may process information and provide resulting data or parameters to any device, e.g., over network 130.

For example, key performance indicator (KPI) parameters related to a session, an agent, a customer and/or a product may be computed or calculated by a module on server 150 (e.g., based on data stored in storage 153) and may be displayed on expert device 140. Raw data, e.g., a recorded portion of a session may be provided at a mobile communication device such as expert device 140. Any information related to a relevant entity, e.g., a customer, an agent, a product or a campaign may be provided to an expert by a wireless mobile device such as device 140, including textual information, images and multimedia content. As described herein (e.g., with respect to FIG. 4), an expert may select to be proved with information related to an agent in a first portion of a display, information related to a customer on a second portion of a display and information related to a product on a third portion of the same display of a mobile communication device.

As shown by block 220, the flow may include including a mobile communication device in a session, the session already including a device operated by an agent and a device operated by a customer. For example, expert device 140 may be included in a call already including agent device 110 and customer device 160. For example, including a mobile communication device in a session, the session already including a device operated by an agent and a device operated by a customer may be by establishing a voice conference call including devices operated by the customer, the agent and the expert, e.g., devices 160, 110 and 140. In other embodiments, e.g., when suitable devices or modules are used, including a device operated by an expert may be by establishing a video conference including devices operated by the customer, the agent and the expert, e.g., devices 160, 110 and 140.

Including an expert in a session may be automatic and according to rules. For example, including an expert in a session may be according to rules and/or information related to the session, rules and/or information related to the agent, the customer, a product discussed, a campaign, a work load or any other criteria, rule or parameter. Including an expert in a session may be according to one or more of a number of modes. For example, SSMM 151 or ASMM 111 may monitor any relevant parameter related to a session (e.g., a call duration, an emotion of a customer or agent) may apply a rule or criteria to a monitored parameter and may determine that an expert is to be included in the session according to a mode that may be automatically selected. For example, based on a rule, when a specific product is discussed over a session for more than a predefined number of minutes an expert may be automatically included in the session in "listen only", "silent" or "whisper" mode.

Figure 4:
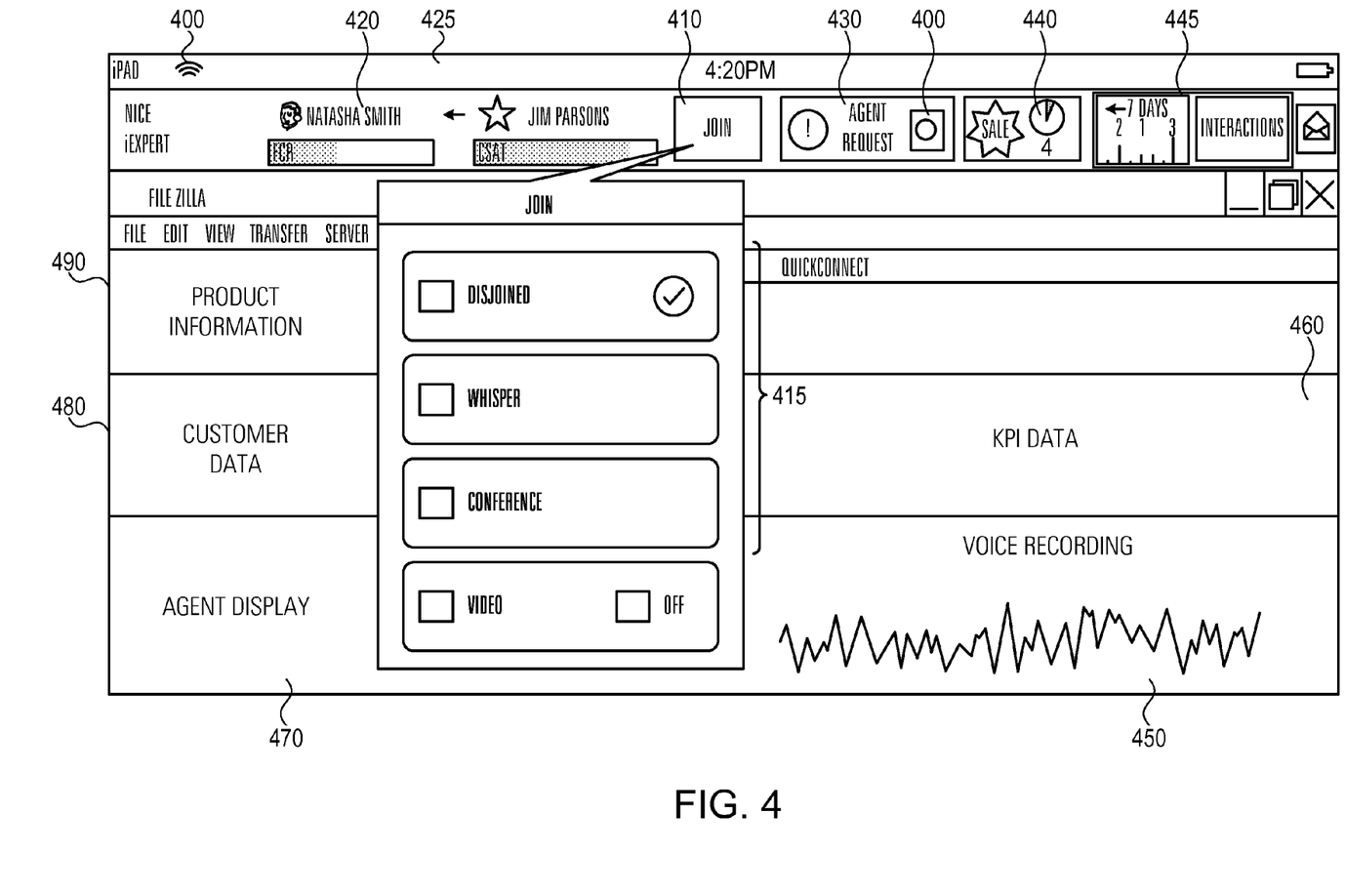
FIG. 4 shows an exemplary screenshot according to embodiments of the invention.

Reference is additionally made to FIG. 4 that shows an exemplary screenshot 400 according to embodiments of the invention. As shown by screenshot 400, possibly after selecting a session from a list of sessions, e.g., a list as shown by FIG. 3, the expert may be provided with various information related to the session. As shown by 420, an agent's name may be displayed, as shown by 425, a customer's name may be displayed, as shown by 430, an indication that the agent requested assistance may be displayed, as shown by 440, information such as call duration and the type of session (that may be, for example, "sale" or "support") may be shown, other information, e.g., number and/or distribution of calls by the customer may be shown as shown by 445.

As shown by 410, the expert may be enabled to select to join the session, accordingly, including an expert in a session or call may be according to a selection of the expert. A mode according to which an expert joins a session may be according to a selection of the expert, accordingly, an expert may select the mode according to which he or she will be included in a session. For example and as shown by 415, upon selecting to join a session, a list of modes may be displayed enabling the expert to select the mode of inclusion. For example, the expert may select a whisper mode enabling the agent to hear the expert yet preventing the customer from hearing the expert. Other exemplary modes may be a "conference call" or a "video conference".

Figure 6:
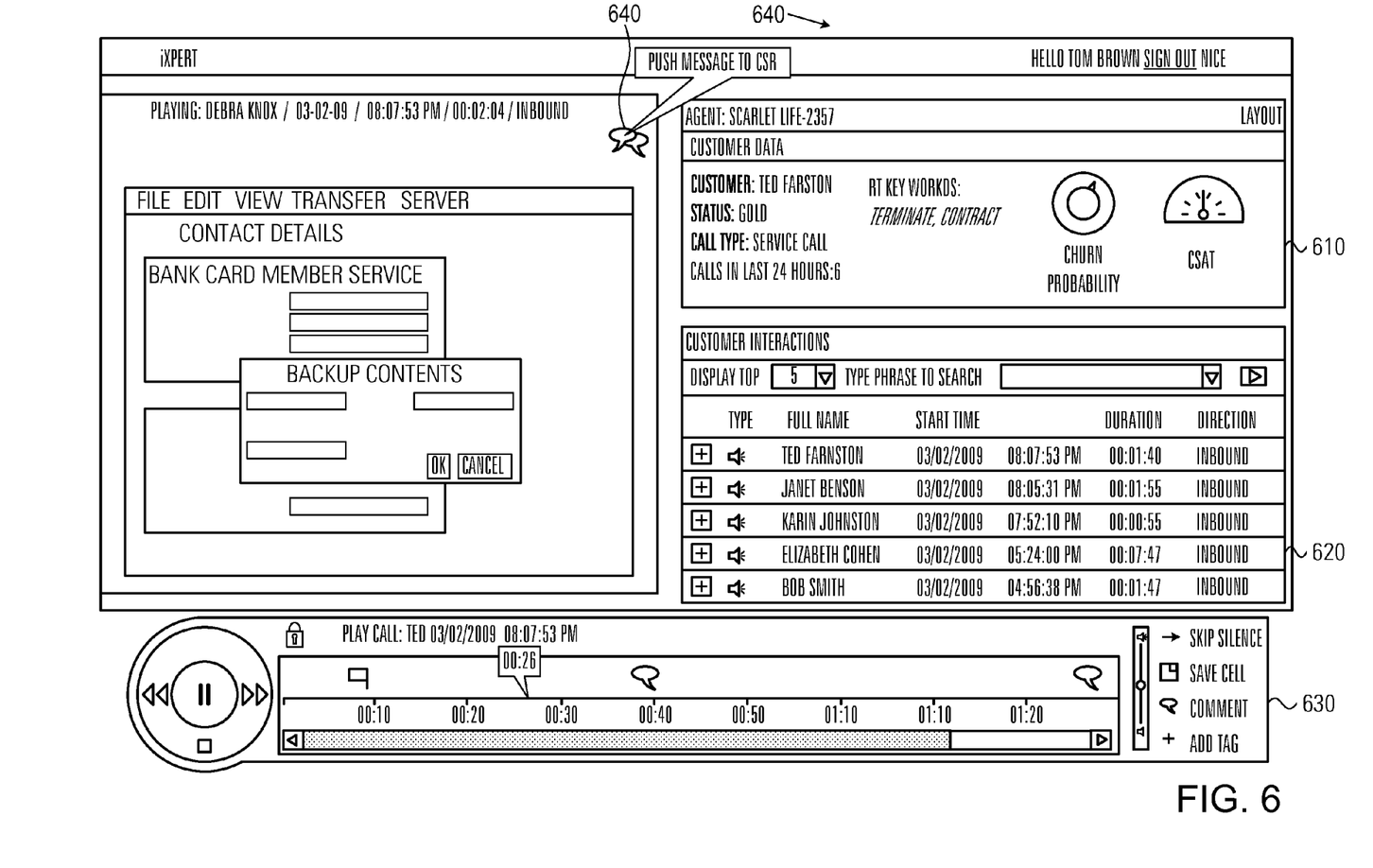
FIG. 6 shows an exemplary screenshot according to embodiments of the invention.

In another case, configuration or embodiment, other formats or layouts may be used. Reference is now made to FIG. 6 that shows an exemplary screenshot 600 according to embodiments of the invention. As shown by 650, a recording or streaming of an agent's screen (e.g., a screen or display of agent device 120) may be provided to the expert on the expert device, e.g., expert device 140. A pane or region such as 650 may enable an expert full interaction with a device of an agent, e.g., using remote control applications or setups known in the art. As shown by 640, an expert may be enabled to send a text message to an agent, e.g., in a similar manner used and/or enabled by chat applications. As shown by 610, customer and call information or parameters, key or other words detected in the session, a churn probability or any other information may be displayed. KPI information may be displayed, e.g., a customer satisfaction score or a customer value score.

As shown 620, a set of recorded sessions as available, e.g., in storage 153, may be displayed to enable selection for replay, e.g., as shown by 630. Recorded interactions or sessions selected for being displayed as shown by 620 may be selected based on any criteria or metadata, e.g., based on a time and date of a call, based on audio analysis (e.g. calls where the competitor has been mentioned) etc. Any data may be replayed as shown by 630. For example, a replay of a session may include replaying a voice recording of an agent and a customer and, synchronously replaying screen data captured from the screen of a device operated by the agent. For example, any one or more of screen regions 450, 460, 470, 480 and/or 490 may be used to display one or more synchronized data in a replay of a session.

Any relevant information related to recorded information may presented. For example and as shown, a type of session or call, a name or other indication of an agent who handled the session, a date, a duration and a direction (e.g., incoming or outgoing) may all be displayed thus helping the expert in selecting a relevant session to be replayed. It will be noted that replaying a session may include replaying any information, e.g., voice, image or multimedia content such as video.

In one embodiment, being provided with a display related to a specific interaction or session as shown by FIG. 4 may be by selecting a session from a list of session. Reference is additionally made to FIG. 5 that shows an exemplary screenshot 500 according to embodiments of the invention. As shown by FIG. 5, information related to a set of interactions or sessions may be displayed. For example, the set may be selected by selecting interactions related to agents associated with a specific expert. Exemplary information or parameters displayed for interactions are shown by 510-560. As shown by 510 a channel name (e.g., an extension number) may be shown, as shown by 520, a duration of the session may be shown, as shown by 530, a predictor of a rule being met or a threshold may be breached may be displayed. For example, if a rule related to a call duration is used in order to determine that intervention of an expert is needed than the probability of assistance being required or needed may grow with time. Such probability may be presented by a predictor as shown by 530. In other cases or embodiments, a predictor or KPI may reflect a likelihood of an interaction or session being or becoming problematic. For example, ASMM 111 may provide a real time analytics engine with a voice stream of an interaction or session and the real time analytics engine may indicate that a competition has been mentioned.

Accordingly, an expert can predict future events and/or plan his or her activities, e.g., prioritize providing assistance or provide assistance before it is requested by an agent or select to join an interaction when a predictor indicates the session is escalating. Accordingly, embodiments of the invention may enable an expert to take proactive measures.

As shown by 540, a rule associated with or applied to the session may be shown or indicated. For example, a rule shown may comprise the name of the rule which has caused a KPI predictor to indicate a risk. For example and as shown, a rule may be call duration. Accordingly, when an expert sees that a predictor indicates a high probability that intervention or assistance may be needed, the expert may further be informed as to why, or based on what, such probability was determined.

A status may be shown as shown by 550. For example, a status may be "assistance requested", "session progressing normally" and the like. A status may be indicated by color, for example, red may indicate an active call for which assistance was requested (e.g., based on input from an agent), black may indicate an active session for which assistance is required (e.g., based on a rule being breached), orange may indicate sessions progressing normally and cyan may indicate paused sessions (e.g., a customer was placed on hold).

Accordingly, an expert may quickly determine the status and state of agents and/or session he or she may need to be involved in. As shown by 560, textual information may provide any relevant information, e.g., call type, e.g., sale, billing or service, customer grade or rank, e.g., gold, bronze or silver, and a subject being discussed, e.g., purchasing a product, discussing a bill etc. It will be understood that any other relevant information may likewise be provided. For example, any information in registration table 152 and/or in a CRM or other system or storage (e.g., storage 153) may be retrieved, e.g., by SSMM 151, processed and displayed as shown by screenshot 500. Accordingly, selecting a specific session as shown by FIG. 4 may be based on information having high relevance to assisting agents by an expert.

According to some embodiments, an indication of required assistance may be generated by, or sent from, a first device operated by an agent and based on such indication, the mobile communication device operated by an expert may be included in a session that already includes a second device operated by the agent. For example, upon detecting that a new (and possibly inexperienced) agent is activating a predefined application on his computer (e.g., agent device 110) while talking to a customer on his phone (e.g., agent device 120), ASMM 111 may generate an indication of required assistance. However, although the indication was generated by agent device 110, the expert device (e.g., expert device 140) may be automatically included in a session that includes agent device 120. Similarly, upon detecting a specific word in a conversation of an agent with a customer, an expert device may be included in a web session that includes the agent's computer and a customer's computer. Such configuration may enable including an expert in a session regardless of the device that originated a request for assistance.

It will be noted that although the system shown in FIG. 1 includes a server 150, some embodiments may deviate from such configuration. For example, association of agent devices with expert devices may be according to a configuration at the agent devices, e.g., an expert device address, port number or other parameter may be provided to an agent device thus bypassing the need of a server. Registration table 152 or parts thereof may duplicated, provided to each agent or expert device and further updated as needed on each relevant device. For example, an expert using her device may change an association of an agent device and an expert device by interacting with an agent device and changing the expert device to be alerted by the agent device. Any information used, or operations performed, based on registration table 152 may be performed by a server-less system. For example, an IP address of an expert device to be provided with an indication of required assistance may be configured at an agent device, accordingly, an indication may be sent directly from the agent device to an expert device.

As shown by block 225, the flow may include displaying at least some of the content displayed on a device operated by the agent on a display of the mobile communication device. For example, as shown by 470, any graphical information displayed on a display of a device operated by an agent may be displayed on a display of the expert's device. Any data captured from a screen of an agent may be provided on the expert's device. For example, real time data showing activities of the agent in real time may be displayed and/or recorded screen data showing past activities of the agent may be presented.

An expert's device (e.g., expert device 140) may be capable of simultaneously handling, supporting or enabling a number of channels, e.g., a voice channel and a data channel. Accordingly, using an expert device such as expert device 140, an expert may speak to an agent, view customer data and be provided with a recording of a previous session at the same time. In some embodiments, the expert may be enabled to graphically or otherwise interact with an agent's device. For example, using a stylus, mouse and/or keyboard, an expert may interact with a device operated by an agent (e.g., agent device 120) by interacting with his or her wireless mobile device. Any application, e.g., a commercial application for remote assistance may be used in order to enable an expert to remotely interact with an agent's device as shown by 470.

As shown by block 230, the flow may include obtaining from a storage system information related to the customer and displaying the information on the mobile communication device. For example, as shown by 480, information related to the customer may be presented. For example, SSMM 151 may retrieve any information related to the customer from a CRM system on storage 153, may provide such information to ESMM 141 which may present the information in a portion 480 on a display of expert device 140.

As shown by block 235, the flow may include obtaining from a storage system information related to the session and presenting the information at the mobile communication device. For example, SSMM 151 may retrieve any information related to a session from storage 153, may provide such information to ESMM 141 which may present the information in portions 460 and 450 on a display of expert device 140. For example and as shown by 450, a recording of the session or of a previous session with the customer may be provided to an expert, e.g., based on a request and/or an indication of a recorded session or time period. As shown by 460, KPI information related to the session, the customer, the agent or any relevant entity or aspect may be provided. Likewise and as shown by 490, information related to a product may be presented. For example, prices, discounts or warrantees may be displayed. Accordingly, any relevant information may be provided to an expert as well as enabling the expert to review any related activity, either past or present of the agent.

Figure 7:
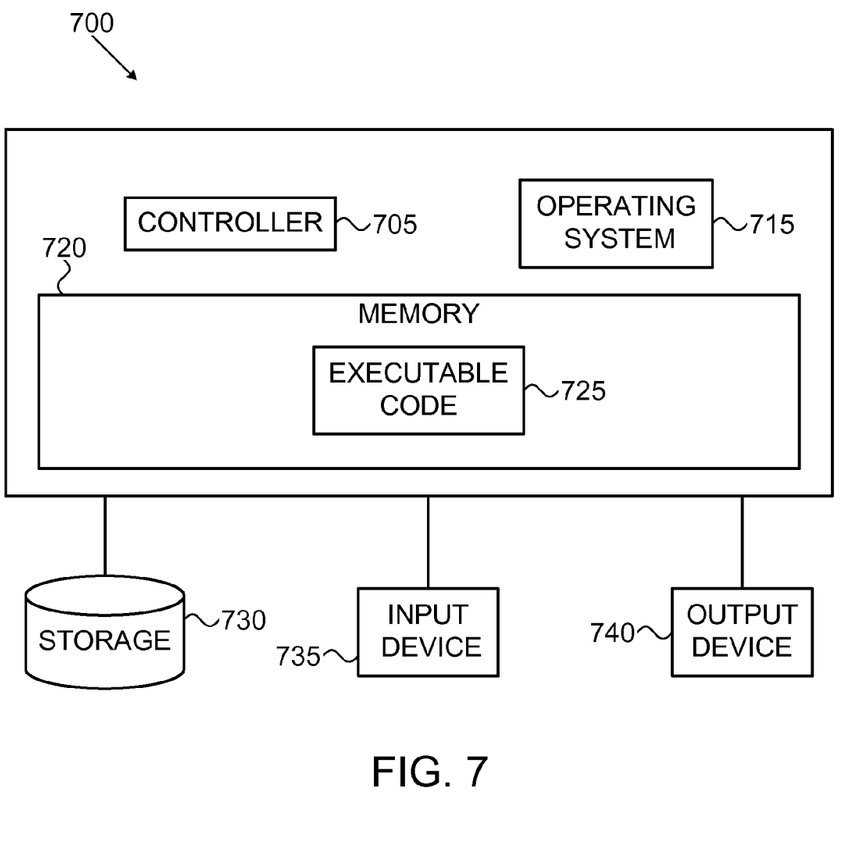
FIG. 7, shows high level block diagram of an exemplary computing device according to embodiments of the present invention.

Reference is made to FIG. 7, showing a high level block diagram of an exemplary computing device 700 according to embodiments of the present invention. Agent devices 110 and 120, expert device 140 and server 150 may be, may include or may be part of a computing device such as computing device 700. In some embodiments, agent devices 110 and 120, expert device 140 and server 150 may include a subset of components included in device 700. Accordingly, embodiments of the invention may be realized using a device or article similar to device 700, e.g., as any one of agent devices 110 and 120, expert device 140 and/or server 150.

Computing device 700 may include a controller 705 that may be, for example, a central processing unit processor (CPU), a chip or any suitable computing or computational device, an operating system 715, a memory 720, a storage 730, an input device 735 and an output device 740. Operating system 715 may be or may include any code segment designed and/or configured to perform tasks involving coordination, scheduling, arbitration, supervising, controlling or otherwise managing operation of computing device 700, for example, scheduling execution of programs. Operating system 715 may be a commercial operating system. Memory 720 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 720 may be or may include a plurality of, possibly different memory units.

Executable code 725 may be any executable code, e.g., an application, a program, a process, task or script. Executable code 725 may be executed by controller 705 possibly under control of operating system 715. Storage 730 may be or may include, for example, a hard disk drive, a floppy disk drive, a Compact Disk (CD) drive, a CD-Recordable (CD-R) drive, a universal serial bus (USB) device or other suitable removable and/or fixed storage unit. Input devices 735 may be or may include a mouse, a keyboard, a touch screen or pad or any suitable input device. It will be recognized that any suitable number of input devices may be operatively connected to computing device 700 as shown by block 735. Output devices 740 may include one or more displays, speakers and/or any other suitable output devices. It will be recognized that any suitable number of output devices may be operatively connected to computing device 700 as shown by block 740. Any applicable input/output (I/O) devices may be connected to computing device 700 as shown by blocks 735 and 740. For example, a network interface card (NIC), a printer or facsimile machine, a universal serial bus (USB) device or external hard drive may be included in input devices 735 and/or output devices 740.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 720, computer-executable instructions such as executable code 725 and a controller such as controller 705. For example, executable code 725 may be a set of instructions that when executed cause a controller to execute any functionality described herein as performed by any one of agent devices 110 and 120, expert device 140 and/or server 150.

Some embodiments may be provided in a computer program product that may include a non-transitory machine-readable medium, stored thereon instructions, which may be used to program a computer, or other programmable devices, to perform methods as disclosed herein. Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including floppy disks, optical disks, compact disk read-only memories (CD-ROMs), rewritable compact disk (CD-RWs), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

A system according to embodiments of the invention may include components such as, but not limited to, a plurality of central processing units (CPU) or any other suitable multi-purpose or specific processors or controllers, a plurality of input units, a plurality of output units, a plurality of memory units, and a plurality of storage units. A system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method of assisting a service representative in an enterprise, the method comprising:
    associating a device operated by the service representative and a mobile communication device operated by an expert by a registration at a server;
    receiving at the server an indication that the service representative requires assistance;
    based on the association, providing a corresponding indication to the mobile communication device;
    including the mobile communication device in a session, said session including said device operated by the service representative and a device operated by a customer;
    causing at least some of the content displayed on the device operated by the service representative to be displayed on a display of the mobile communication device operated by the expert; and
    providing from a storage system to the mobile communication device information related to the session to be displayed on the mobile communication device.

2. The method of claim 1, comprising enabling the expert to graphically interact with said device operated by the service representative.

3. The method of claim 1, comprising providing a recorded portion of the session at the mobile communication device.

4. The method of claim 1, comprising associating the device operated by the service representative and the mobile communication device by a registration at a telephony system and wherein including the mobile communication device in a session comprises including the mobile communication device in a telephone call.

5. The method of claim 1, comprising displaying status information related to at least one service representative on the mobile communication device and including the mobile communication device in a session based on a selection of the expert.

6. The method of claim 1, comprising sending an indication that the service representative requires assistance to the server based on an action of the service representative.

7. The method of claim 1, comprising sending an indication that the service representative requires assistance to the server based on a rule.

8. The method of claim 7, wherein the rule is related to at least one of: a call duration, a probability of a successful completion of a call, content communicated over a session, a service representative, a customer, a product and a service.

9. The method of claim 1, comprising displaying, on the mobile communication device, key performance indicator (KPI) parameters related to at least one of: the session, the service representative and the customer.

10. The method of claim 1, comprising displaying, on the mobile communication, at least one of: a call duration, a call status, a probability of a successful completion of a call, a parameter related to the service representative and a reason for a request of assistance.

11. The method of claim 1, comprising establishing a voice conference call including the customer, the service representative and the expert.

12. The method of claim 11, wherein only the service representative can hear the expert.

13. The method of claim 1, comprising establishing a video conference including the customer, the service representative and the expert.

14. The method of claim 1, comprising obtaining from a server information related to the session and displaying the information on the mobile communication device.

15. A system for assisting a service representative in an enterprise, comprising:
a first module installed in a device operated by a service representative, the first module configured to generate a request for assistance;
a second module installed in a mobile communication device operated by an expert, the second module configured to:
receive the request;
include the mobile communication device in a session, the session including said device operated by the service representative and a device operated by a customer;
display at least some of the content displayed on said device operated by the service representative on a display of the mobile communication device;
obtain from a storage system information related to the session; and
display the information on the mobile communication device.

16. The system of claim 15, comprising a server to associate the device operated by the service representative and the mobile communication device based on a registration of the device operated by the service representative and the mobile communication device.

17. The system of claim 16, wherein the server is to receive the indication from the device operated by the service representative and to communicate an indication of required assistance to the mobile communication device.

18. The system of claim 15, wherein the second module is configured to display on the mobile communication device key performance indicator (KPI) parameters related to at least one of: the session, the service representative and the customer.

19. The system of claim 15, wherein generating the indication is based on a rule.

20. The system of claim 15, wherein the second module is configured to enable the expert to graphically interact with a device operated by the service representative.

* * * * *